(12) United States Patent
Kim et al.

(10) Patent No.: US 9,715,437 B2
(45) Date of Patent: *Jul. 25, 2017

(54) PULSED-LATCH BASED RAZOR WITH 1-CYCLE ERROR RECOVERY SCHEME

(71) Applicant: INTERNATIONAL BUSINESS MACHINES CORPORATION, Armonk, NY (US)

(72) Inventors: Jae-Joon Kim, Yorktown Heights, NY (US); Yu-Shiang Lin, Elmsford, NY (US); Insup Shin, Daejeon (KR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,602

(22) Filed: Jan. 22, 2016

(65) Prior Publication Data

US 2016/0140005 A1    May 19, 2016

Related U.S. Application Data

(63) Continuation of application No. 13/941,969, filed on Jul. 15, 2013, now Pat. No. 9,292,390, which is a (Continued)

(51) Int. Cl.
*G06F 11/16* (2006.01)
*G06F 11/14* (2006.01)
(Continued)

(52) U.S. Cl.
CPC .......... *G06F 11/2215* (2013.01); *G06F 1/04* (2013.01); *G06F 1/10* (2013.01); *G06F 11/1402* (2013.01);
(Continued)

(58) Field of Classification Search
CPC .......... G06F 11/1604; G06F 11/1412
(Continued)

(56) References Cited

U.S. PATENT DOCUMENTS 3,747,065 A * 7/1973 Gibson ............... H04L 25/497
375/346
3,812,403 A * 5/1974 Gartner .............. G07C 9/00698
307/10.4
(Continued)

FOREIGN PATENT DOCUMENTS

EP          1236222 B1    7/2003
WO    2012/164541 A1    12/2012

OTHER PUBLICATIONS

Austin et al., "Making Typical Silicon Matter with Razor," Computer, Mar. 2004, vol. 37, Issue 3, pp. 57-65.
(Continued)

*Primary Examiner* — Joseph D Torres
(74) *Attorney, Agent, or Firm* — Tutunjian & Bitetto, P.C.; Rabin Bhattacharya

(57) ABSTRACT

Systems and methods for error recovery include determining an error in at least one stage of a plurality of stages during a first cycle on a hardware circuit, each of the plurality of stages having a main latch and a shadow latch. A first signal is transmitted to an output stage of the at least one stage to stall the main latch and the shadow latch of the output stage during a second cycle. A second signal is transmitted to an input stage of the at least one stage to stall the main latch of the input stage during the second cycle and to stall the main latch and the shadow latch of the input stage during a third cycle. Data is restored from the shadow latch to the main latch for the at least one stage and the input stage to recover from the error.

13 Claims, 13 Drawing Sheets

Related U.S. Application Data continuation of application No. 13/918,587, filed on Jun. 14, 2013, now Pat. No. 9,009,545.

(51) Int. Cl.
*G06F 11/22* (2006.01)
*G06F 1/04* (2006.01)
*G06F 1/10* (2006.01)

(52) U.S. Cl.
CPC ...... *G06F 11/1407* (2013.01); *G06F 11/1415* (2013.01); *G06F 11/1604* (2013.01); *G06F 11/1608* (2013.01)

(58) Field of Classification Search
USPC .................................................. 714/51, 48
See application file for complete search history.

(56) References Cited

U.S. PATENT DOCUMENTS

| | | | | |
|---|---|---|---|---|
| 4,647,983 | A * | 3/1987 | Ota .................... | H04N 5/78263 386/308 |
| 4,959,733 | A * | 9/1990 | Miura .................... | G11B 19/28 360/73.03 |
| 5,220,206 | A * | 6/1993 | Tsang .................... | H03L 7/0896 327/269 |
| 6,035,389 | A * | 3/2000 | Grochowski ......... | G06F 9/3836 712/215 |
| 6,084,907 | A * | 7/2000 | Nagano .............. | H03H 21/0012 375/230 |
| 7,671,627 | B1 * | 3/2010 | Somani ................. | G06F 9/3861 326/46 |
| 8,407,537 | B2 | 3/2013 | Flautner et al. | |
| 8,621,272 | B2 * | 12/2013 | Das ................. | G01R 31/31816 714/10 |
| 2002/0087842 | A1 * | 7/2002 | Smith ................. | G06F 11/3664 712/227 |
| 2004/0223386 | A1 * | 11/2004 | Mudge ................. | G06F 1/3203 365/202 |
| 2005/0022094 | A1 * | 1/2005 | Mudge ................. | G06F 9/3861 714/758 |
| 2006/0288196 | A1 * | 12/2006 | Unsal .................... | G06F 9/3861 712/235 |
| 2007/0018864 | A1 | 1/2007 | Khan et al. | |
| 2007/0086267 | A1 * | 4/2007 | Kwak ...................... | G11C 7/02 365/233.1 |
| 2008/0126743 | A1 * | 5/2008 | Jusufovic ............ | G06F 9/30181 712/1 |
| 2009/0024888 | A1 * | 1/2009 | Kurimoto ........ | G01R 31/31858 714/731 |
| 2009/0106616 | A1 * | 4/2009 | Ozer ..................... | G06F 9/3842 714/746 |
| 2009/0249175 | A1 * | 10/2009 | Chandra ................. | G06F 11/00 714/822 |
| 2011/0060975 | A1 * | 3/2011 | Pappalardo ......... | G06F 11/0751 714/817 |
| 2011/0107166 | A1 * | 5/2011 | Flautner .............. | G06F 11/1604 714/746 |
| 2011/0191646 | A1 * | 8/2011 | Louri ................... | G06F 13/4045 714/746 |
| 2011/0202786 | A1 * | 8/2011 | Fojtik ................... | G06F 9/3869 713/401 |
| 2011/0302460 | A1 | 12/2011 | Idgunji et al. | |
| 2013/0086444 | A1 * | 4/2013 | Liu ......................... | G06F 11/08 714/752 |
| 2014/0019815 | A1 * | 1/2014 | Bull ..................... | G06F 11/0721 714/55 |

OTHER PUBLICATIONS

Bowman et al., "Energy-Efficient and Metastability-Immune Timing-Error Detection and Instruction- Replay-Based Recovery Circuits for Dynamic-Variation Tolerance" Solid-State Circuits Conference, Nov. 2008. (3 pages).

Bowman et al., "A 45 nm resilient microprocessor core for dynamic variation tolerance," IEEE Journal of Solid-State Circuits, vol. 46, No. 1, Jan. 2011, pp. 194-208.

Das et al., "Razor II: In situ error detection and correction for PVT and SER tolerance," IEEE Journal of Solid-State Circuits, vol. 44, No. 1, Jan. 2009, pp. 32-48.

Drake et al., "A distributed critical-path timing monitor for a 65 nm high-performance microprocessor," in Proc. IEEE Int. Solid-State Circuits Conf., Feb. 2007, pp. 398-399.

Ernst et al., "Razor: Circuit-level correction of timing errors for lowpower operation," IEEE Micro, vol. 24, No. 6, Nov.-Dec. 2004, pp. 10-20.

Ernst et al., "Razor: A Low-Power Pipeline Based on Circuit-Level Timing Speculation," Proceedings of the 36th International Symposium on Microarchitecture, Dec. 2003. (12 pages).

Fojtik et al., "Bubble Razor: An Architecture-Independent Approach to Timing-Error Detection and Correction," Solid-State Circuits Conference Digest of Technical Papers (ISSCC), Feb. 2012. (3 pages).

Lee et al., "Pulse Width Allocation and Clock Skew Scheduling: Optimizing Sequential Circuits Based on Pulsed Latches," IEEE Transactions on Computer-Aided Design of Integrated Circuits and Systems, vol. 29, No. 3, Mar. 2010, pp. 355-366.

Muhtaroglu et al., "On-die droop detector for analog sensing of power supply noise," IEEE Journal of Solid-State Circuits, vol. 39, No. 4, Apr. 2004, pp. 651-660.

Tschanz et al., "Tunable replica circuits and adaptive voltage frequency techniques for dynamic voltage, temperature, and aging variation tolerance," in Proc. Symp. on VLSI Circuits, Dec. 2009, pp. 112-113.

Tschanz et al., "Adaptive frequency and biasing techniques for tolerance to dynamic temperature-voltage variations and aging," in Proc. IEEE Int. Solid-State Circuits Conf., Feb. 2007, pp. 292-293.

\* cited by examiner

1300

Determining an error in at least one stage of a plurality of stages during a first cycle, each of the plurality of stages having a main latch and a shadow latch
1302

Transmitting a clock gating signal in response to the error
1304

Transmitting a first signal to an output stage of the at least one stage to stall the main latch and the shadow latch during a second cycle
1306

Transmitting a second signal to an input stage of the at least one stage to stall the main latch of the input stage during the second cycle and to stall the main latch and the shadow latch of the input stage during a third cycle
1308

Stopping transmission of the first or second signal at a receiving stage where the receiving stage was stalled during a previous cycle
1310

Stopping transmission of the first and second signals at a receiving stage where the receiving stage receives both the first and second signals during a same cycle
1312

Transmitting the second signal from a multiple fan-in stage to an input stage during a same cycle where the multiple fan-in stage receives the first signal
1314

Transmitting the first signal from a multiple fan-out stage to an output stage in a next cycle where the multiple fan-out stage receives the second signal
1316

Restoring data from the shadow latch to the main latch for the at least one stage and the input stage to recover from the error
1318

FIG. 14

PULSED-LATCH BASED RAZOR WITH 1-CYCLE ERROR RECOVERY SCHEME

BACKGROUND

Technical Field

The present invention relates to timing recovery, and more particularly to a single cycle error recovery scheme for a pulsed-latch design.

Description of the Related Art

Synchronous design requires that all paths between latches consume less time than the cycle time minus the guard time. Timing margins are required to account for process-voltage-temperature (PVT) variation and again effects. The razor approach has been proposed. Razor employs a circuit technique to detect and recover timing failure due to PVT variation on the fly. The key advantage of razor design is to eliminate the margins by tolerating dynamic timing errors. However, most designs based on razor involve architectural changes. While the bubble razor does not involve architectural changes, the bubble razor design requires the use of two-phase latches.

SUMMARY

A method for error recovery includes determining an error in at least one stage of a plurality of stages during a first cycle on a hardware circuit, each of the plurality of stages having a main latch and a shadow latch. A first signal is transmitted to an output stage of the at least one stage to stall the main latch and the shadow latch of the output stage during a second cycle. A second signal is transmitted to an input stage of the at least one stage to stall the main latch of the input stage during the second cycle and to stall the main latch and the shadow latch of the input stage during a third cycle. Data is restored from the shadow latch to the main latch for the at least one stage and the input stage to recover from the error.

A system for error recovery includes an error detection module configured to determine an error in at least one stage of a plurality of stages during a first cycle on a hardware circuit, each of the plurality of stages having a main latch and a shadow latch. A control module is configured to transmit a first signal to an output stage of the at least one stage to stall the main latch and the shadow latch of the output stage during a second cycle. The control module is further configured to transmit a second signal to an input stage of the at least one stage to stall the main latch of the input stage during the second cycle and to stall the main latch and the shadow latch of the input stage during a third cycle. The control module is further configured to restore data from the shadow latch to the main latch for the at least one stage and the input stage to recover from the error.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 14 is a block/flow diagram showing a system/method for error recovery, in accordance with one illustrative embodiment.

DETAILED DESCRIPTION OF PREFERRED EMBODIMENTS

Figure 1:
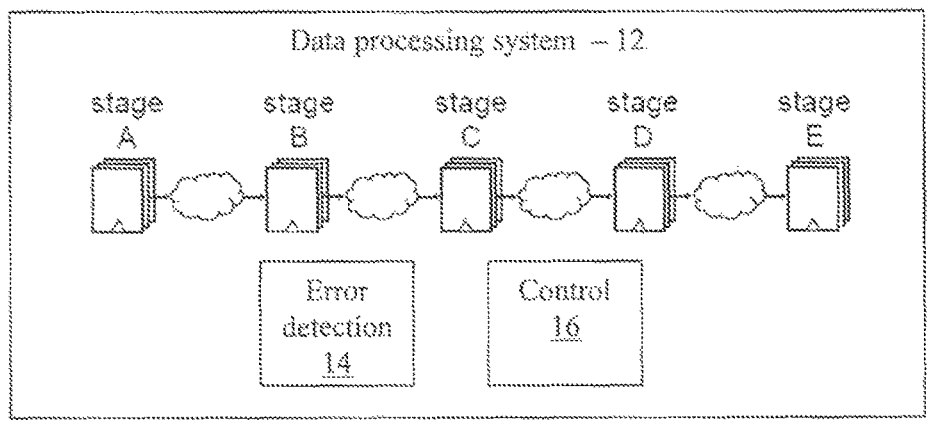
FIG. 1 is block/flow diagram showing a data processing system, in accordance with one illustrative embodiment.

In accordance with the present principles, systems and methods for a pulsed-latch based razor with 1-cycle error recovery are provided. A pipeline may include a number of stages connected in series for processing data. Each stage may include a latch circuit having a main latch and a shadow latch. The present principles provide for a wider pulse for the shadow latch to create an extra timing window to capture timing errors. By providing a wider pulse clocking for the shadow latch, the data in the shadow latch will be correct even when there is a timing error in the main latch. Thus, the shadow latch may be used to restore data to the main latch.

To prevent incorrect data (e.g., due to timing errors) from propagating through the pipeline, the present principles provide gating control signals to recover data within one cycle. When an error occurs, a CG (clock gating) signal is propagated to output stages and an MCG (main clock gating) signal is propagated to input stages from the stage where the error occurred. The CG gating control signal stalls the clocks for both the main latch and the shadow latch for one cycle. The MCG gating control signal stalls the clock for the main latch for one cycle, and stalls the clock for the main latch and the shadow latch for the next cycle. The gating control signals are propagated in a wave-like fashion, such that signals are transmitted to a next stage at each cycle.

Where multiple errors occur, the CG and MCG signals may meet or cross. To maintain proper operation, the signals should be stopped. The present principles provide two stop conditions. First, if a gating control signal is received at a stage which received a clock gating signal in a previous cycle, the clock gating signal stops propagation at the stage. Second, if the CG and MCG signals are propagated to a same stage, the main latch and shadow latch are stalled but propagation of CG and MCG signals are stopped.

In pipelines having multiple fan-out and multiple fan-in stages, data loss and double sampling may occur. To account for data loss, an MCG signal is transmitted from a multiple fan-in stage to an input stage during a same cycle where the multiple fan-in stage receives the CG signal. To account for double sampling, the CG signal is transmitted from a multiple fan-out stage to an output stage in a next cycle where the multiple fan-out stage receives the MCG signal.

To recover from the timing error, data from the shadow latch of the stage where the error occurred is restored to a main latch in a next cycle. Similarly, data from a shadow latch of an input stage is restored to the main latch in the next cycle from when the MCG signal is received. Thus, the pipeline recovers from the timing error in one cycle.

An advantage of the present principles is that one cycle error correction is achieved and can be applied more popular clocking elements, such as flip-flops or pulsed latches. Experimental results have shown that a 5-stage pipeline and 10-stage pipeline employing the present principles consumes 14-24% less power than previous error correction schemes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon, which may be employed for model simulations for software embodiments.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention are described below with reference to flowchart illustrations and/or block diagrams of methods and apparatus (systems) according to embodiments of the invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the present invention will be described in terms of a given illustrative architecture having a wafer; however, other architectures, structures, substrate materials and process features and steps may be varied within the scope of the present invention.

A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a block/flow diagram shows a data processing system 10, in accordance with one illustrative embodiment. The data processing system 12 is preferably a pipeline including a plurality of synchronization elements or stages A-F. Stages may be arranged in series using combinational logic. Each stage may include a latch circuit, including a main latch and a shadow latch, which may be separately clocked (not shown). The system 12 may include an error detection module 14 configured to detect timing errors. Timing errors may be detected by comparing instructions in a main latch with the shadow latch a using, e.g., an exclusive or (XOR) gate. Other approaches to detecting timing errors may also be employed. The system 12 also includes a control module 16 configured to send gating control signals to stages of the system 12 and recover data from the shadow latch.

Figure 2:
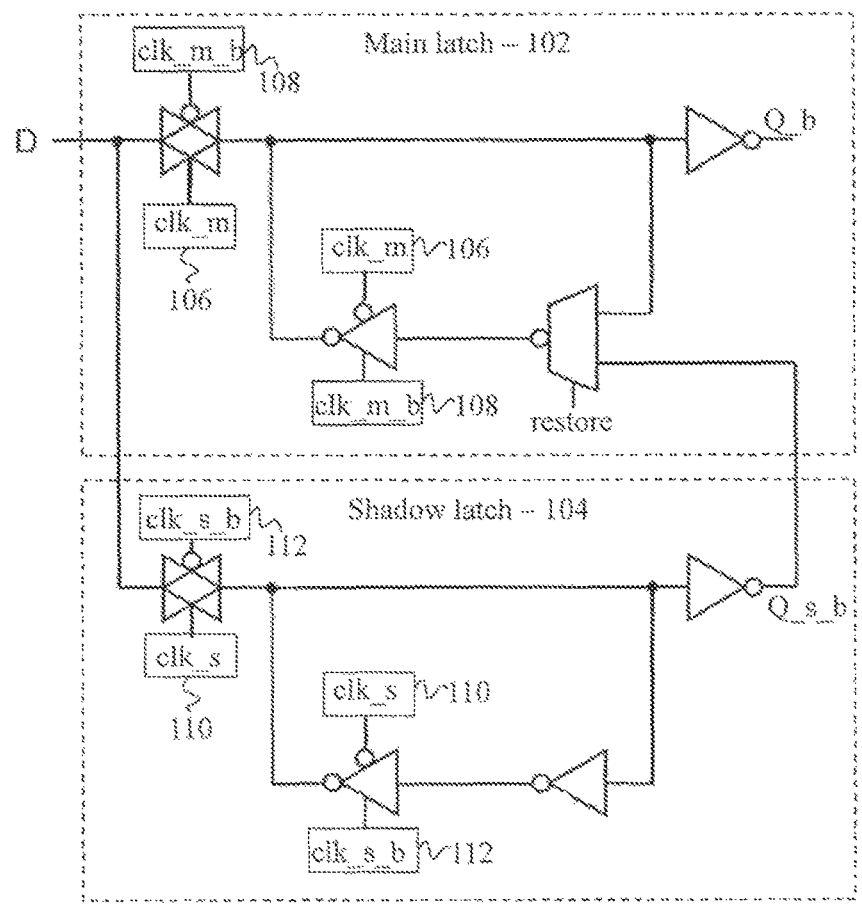
FIG. 2 is a block/flow diagram showing a latch circuit, in accordance with one illustrative embodiment.

Referring to FIG. 2, a block/flow diagram, in partial schematic form, shows a latch circuit 100, in accordance with one illustrative embodiment. The latch circuit 100 may represent one stage of a plurality of stages in a pipeline, such as in FIG. 1. The latch circuit 100 may receive input D from, e.g., an input to the pipeline or from an input stage. The latch circuit may output Q_b to, e.g., an output of the pipeline or to an output stage. The latch circuit 100 preferably includes a main latch 102 and a shadow latch 104. The shadow latch 104 is configured to provide a duplicate of the input signal D. In a preferred embodiment, the main latch 102 and the shadow latch 104 are pulse latches. The clock of the shadow latch 104 provides wider pulses to create extra timing windows to capture timing errors.

When a timing error occurs at a stage of the latch circuit 100, data in the shadow latch 104 will still be correct (due to its wider pulses) and may be employed to restore the data in the main latch 102. However, input data D from an input stage will be lost during the restore cycle. To address this, the present principles gate the main latch for the previous stages to the failed stage, without gating its shadow latch. If the main latch 102 of a stage is gated while its shadow latch 104 is being clocked, the stage can capture input data (at the shadow latch 104) and retain the previous data (at the main latch 102) at the same time. Thus, the stage which detects error can receive the correct data in the next cycle after error correction.

Figure 3:
FIG. 3 shows instruction flow for a pipeline, in accordance with one illustrative embodiment.
Figure 3:

Referring now to FIG. 3, the flow of instructions 200 is shown for a pipeline having stages A-E, in accordance with one illustrative embodiment. A timing error occurs at stage C of cycle 4. The main latch of stage B retains instruction i3 and the shadow latch of stage B stores instruction i4, in cycle 5. As a result, instruction i3 can be propagated to stage C in the next cycle without causing error.

In order to maintain correctness of data, each stage previous to the one where the error occurred eventually goes through a 2-cycle process in which the main latch is gated in the first cycle and data in the shadow latch is restored into its main latch in the second cycle. To prevent the propagation of incorrect data from the stage in which the timing error occurred, two types of clock gating control signals are introduced at the time of error: CG and MCG.

When a stage receives a CG signal, the clock 106, denoted as clk_m, for its main latch and the clock 108, denoted as clk_s, for its shadow latch are gated for one cycle. Gating a latch prevents the latch from being clocked to thereby prevent data from being received by the latch. The CG signal is propagated from the stage where the error occurs to its output stages in a wave-like fashion (i.e., transmitted from stage to stage at each cycle). When a stage receives an MCG signal, its clk_m clock 106 is gated for one cycle, and then both clk_m block 106 and clk_m_b clock 108 are gated for the next cycle. Similar to the way the CG signals are propagated, MCG signals are propagated to the stages previous to the stage having the error in a wave-like fashion.

Figure 4:
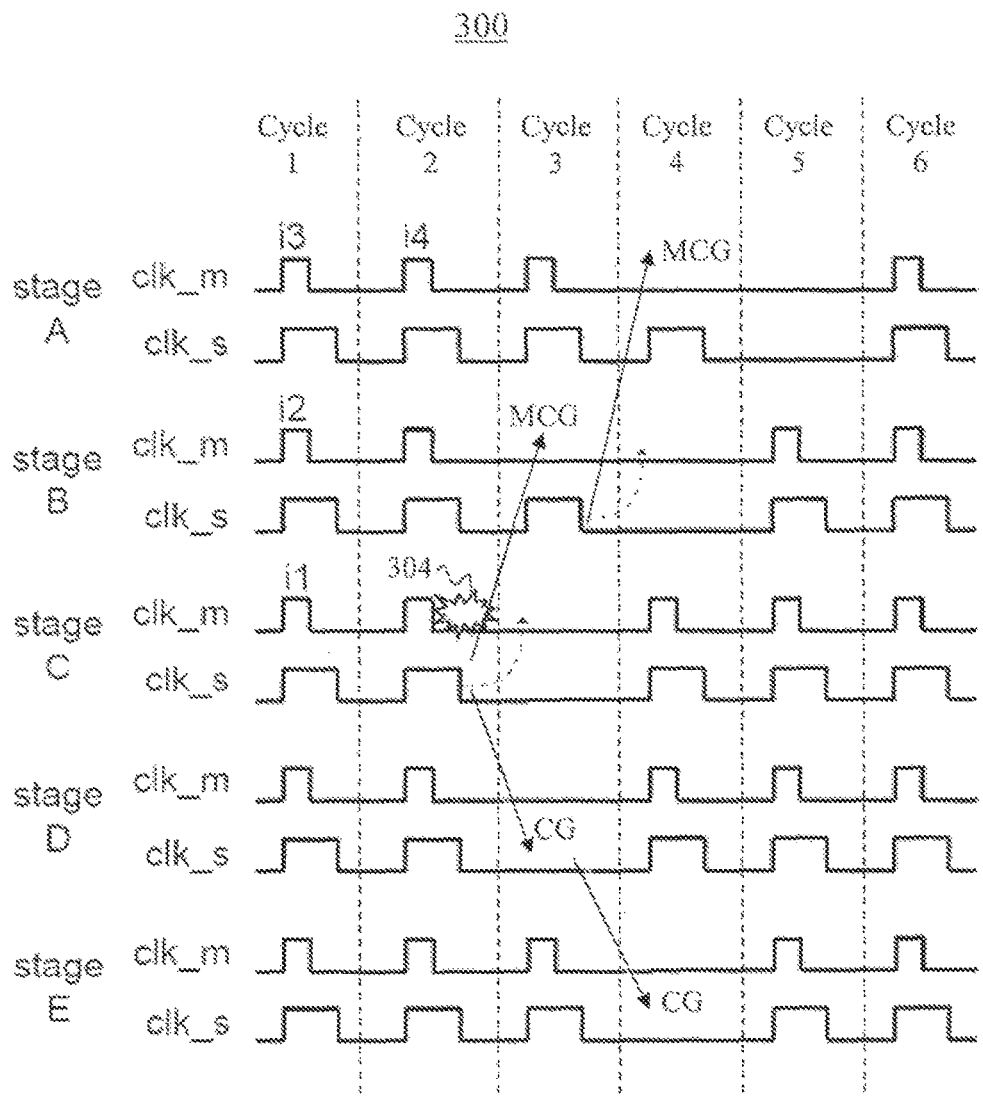
FIG. 4 shows a timing diagram with error recovery, in accordance with one illustrative embodiment.
Figure 4:
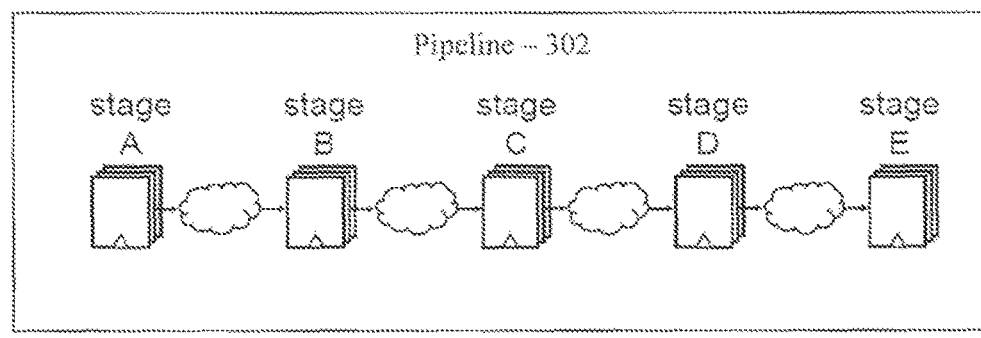

Referring for a moment to FIG. 4, a timing diagram 300 with error recovery is depicted in accordance with one illustrative embodiment. The timing diagram 300 includes stages A-E of a pipeline 302, each having clk_m and clk_s over cycles 1-6. Instructions are propagated through stages of the pipeline 302 in a wave-like fashion. In more detail, during cycle 1, instruction i3 is propagated to stage A, instruction i2 is propagated to stage B, and instruction i1 is propagated to stage C. During cycle 2, instruction i3 is propagated from stage A to stage B, instruction i2 is propagated from stage B to stage C, instruction i1 is propagated from stage C to stage D, and new instruction i4 is propagated to stage A. During normal operation (i.e., no timing errors), the instructions will propagate through the stages of the pipeline 302 in this manner.

At stage C in cycle 2, a timing error 304 occurs. The error 304 creates a CG signal to stall the stages following stage C by one cycle and an MCG signal to gate the main latch of the previous stage in the next cycle and gate both the main latch and shadow latch in the following cycle. The CG and MCG signals are propagated to stages in the pipeline 302 in a wave-like fashion. When the error 304 occurs, the current stage restores the correct data from the shadow latch. The stages that receive the MCG signal also restore its data from its shadow latches.

In further detail, in cycle 3, instruction i2 is restored at stage C by passing the correct data in the shadow latch to the main latch. In the same cycle, the main latch of stage B is gated to prevent data loss while its shadow latch still receives the data from stage A. Stage D must be stalled in cycle 3 because its input data from stage C is incorrect. In cycle 4, instruction i3, which has already arrived at cycle 3, is captures into stage C. Instruction i4 in the shadow latch of stage B is restored into its main latch and stage E is stalled to prevent double sampling of instruction i1.

Figure 5:
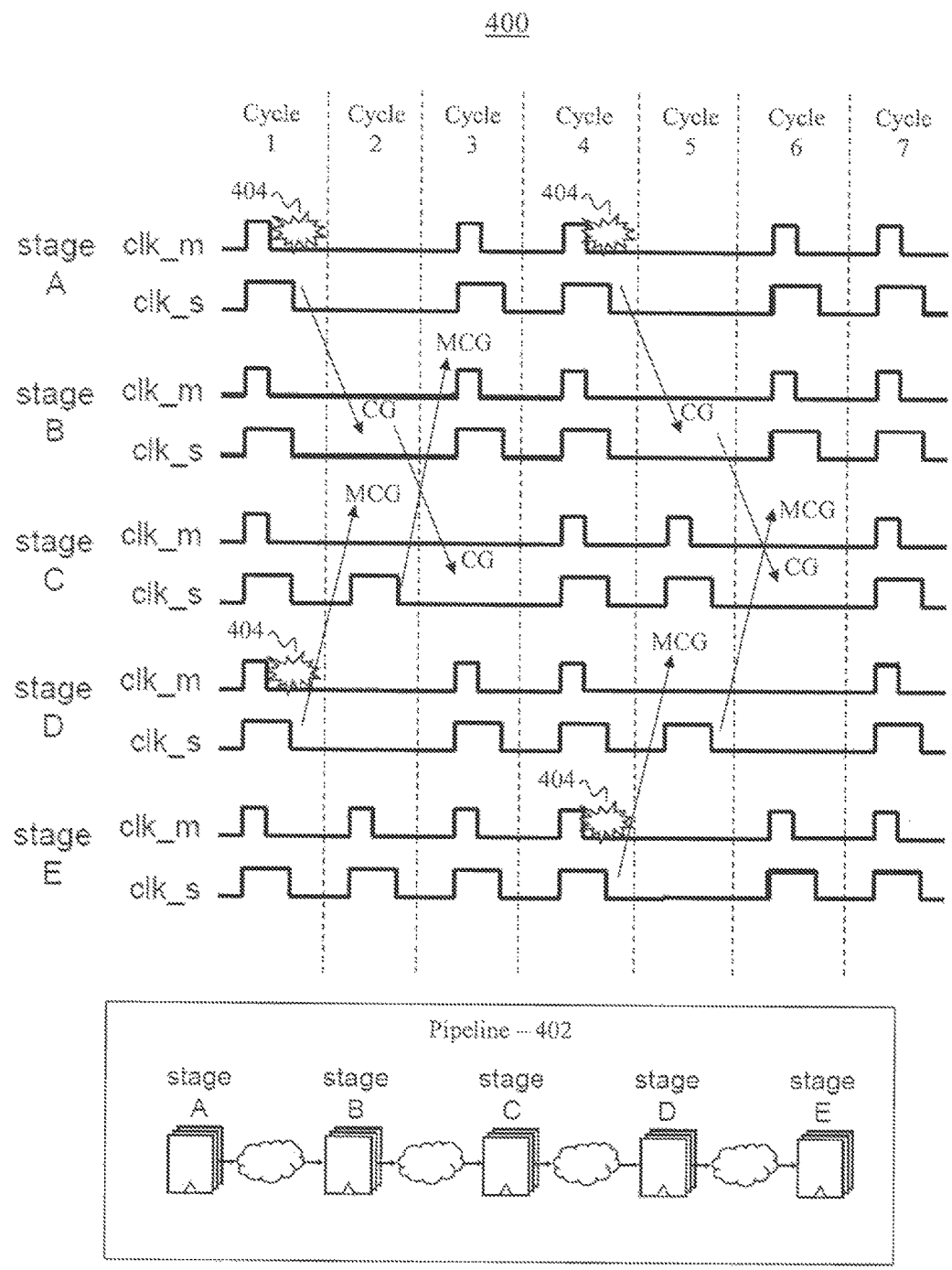
FIG. 5 shows a timing diagram implementing stop conditions, in accordance with one illustrative embodiment.

Referring now to FIG. 5, a timing diagram 400 implementing stop conditions is depicted in accordance with one illustrative embodiment. The timing diagram 400 includes stages A-E of a pipeline 402, each having clk_m and clk_s over cycles 1-7. When multiple errors 404 occur, CG and MCG signals can meet or cross each other. In these cases, the propagation of the CG and MCG signals should be stopped to maintain proper operation. Two stop conditions are employed.

First, if a clock signal is propagated to a stage which was gated (main or shadow latch) in the previous cycle, the clock gating control signal stops propagation at that stage. In FIG. 5, stage C receives the CG signal from stage B in cycle 3, but since the main latch of stage C was gated in cycle 2 by an MCG signal, this CG signal is nullified and is not propagated to stage D. In stage B, an MCG signal is received during cycle 3. However, since stage B received a CG signal in cycle 2, the MCG signal in cycle 3 is nullified.

The second condition is that, if the CG and MCG signals are propagated to a same stage, the main latch and shadow latch are both gated but propagation of the CG and MCG signals are both stopped. In FIG. 5, stage C receives CG and MCG signals in cycle 6. Thus, main latch and shadow latch are gated in cycle 6 and propagations of the CG and MCG signals are stopped.

The error correction scheme of the present principles may be extended to more general cases in which there are loops or multiple fan-out and multiple fan-in stages in the pipeline. In the case of multiple fan-outs and multiple fan-ins, there are two problems that should be addressed.

Figure 6:
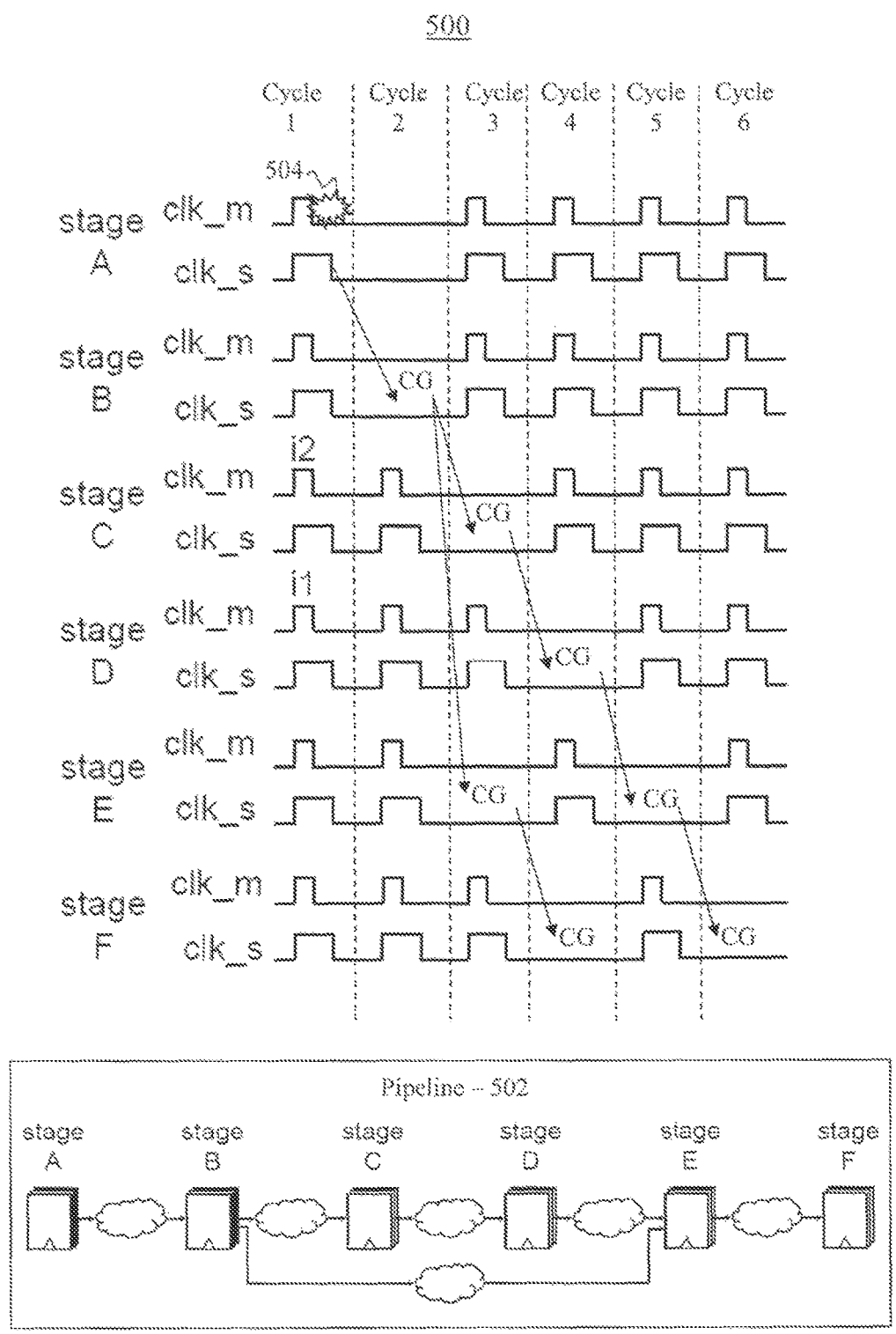
FIG. 6 shows a timing diagram having data loss due to multiple fan-in stages, in accordance with one illustrative embodiment.

The first problem is data loss at a multiple fan-in stage when not all input stages have sent CG signals. Referring now to FIG. 6, a timing diagram 500 showing data loss at stage E is depicted in accordance with one illustrative embodiment. The timing diagram 500 includes stages A-F of a pipeline 502, each having clk_m and clk_s over cycles 1-6. The pipeline 502 includes a multiple fan-out stage (stage B) and a multiple fan-in stage (stage E). An error 504 occurs at cycle 1 of Stage A. A CG signal is propagated from stage A to stage B during cycle 2, and from stage B to stages C and E during cycle 3. Stage E is therefore stalled in cycle 3, resulting in loss of instruction i2 sent from stage D.

Figure 7:
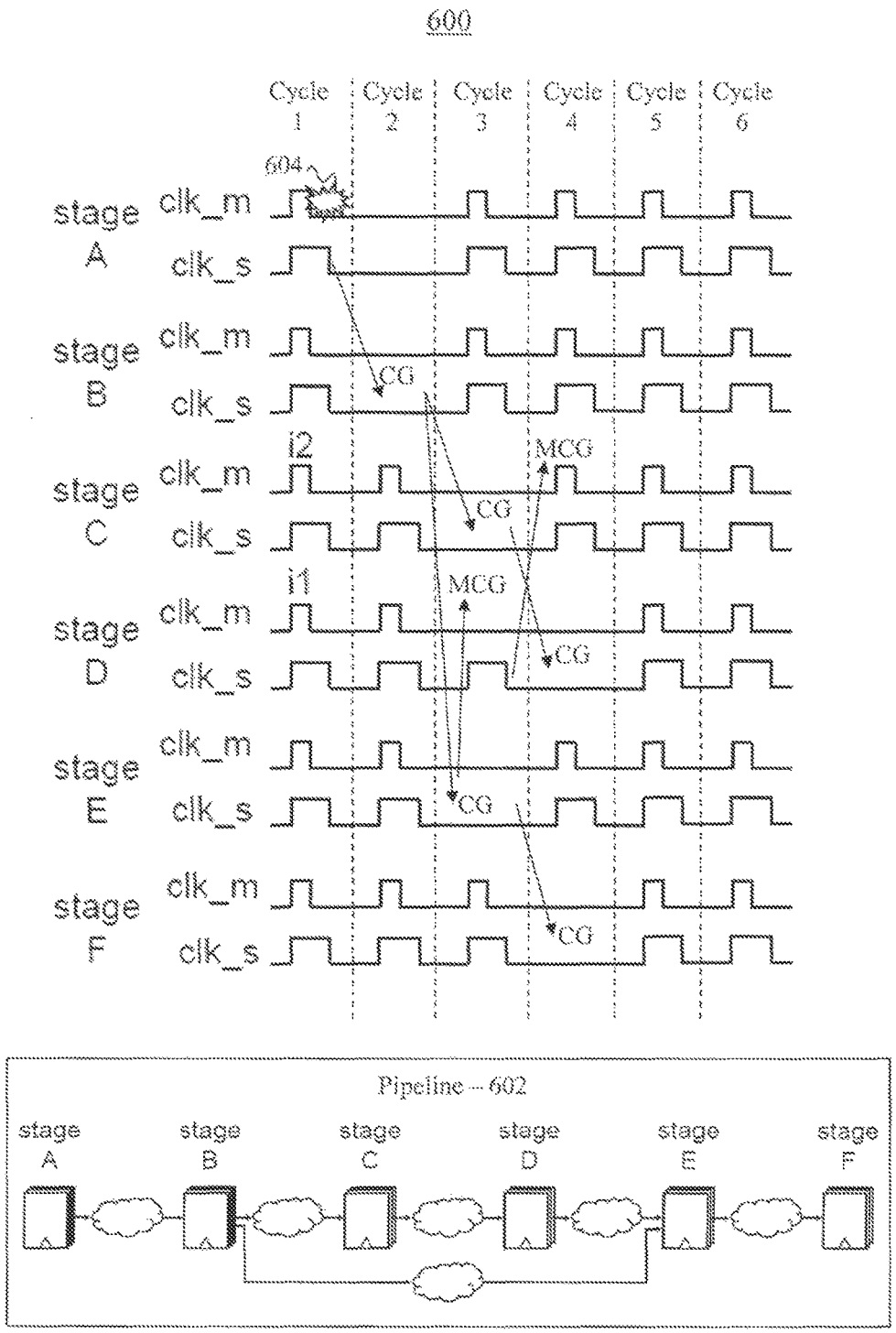
FIG. 7 shows a timing diagram addressing data loss, in accordance with one illustrative embodiment.

The data loss problem due to a multiple fan-in stage can be solved by modifying the propagation approach as follows: if a stage receives a CG signal from any of its input stages, it propagates MCG signals to its input stage in the same cycle. Referring now to FIG. 7, a timing diagram 600 addressing data loss due to multiple fan-in stages is shown in accordance with one illustrative embodiment. During cycle 3, stage E receives a CG signal and sends out an MCG signal to input stage D during the same cycle. An MCG signal is also sent from stage E to stage B (not shown) during cycle 3, however will be immediately nullified due to stage B receiving a CG signal during cycle 2. Each input stage of the multiple fan-in stage will stall for a cycle and propagate the data in the next cycle and, hence, the pipeline can maintain proper data synchronization.

Figure 8:
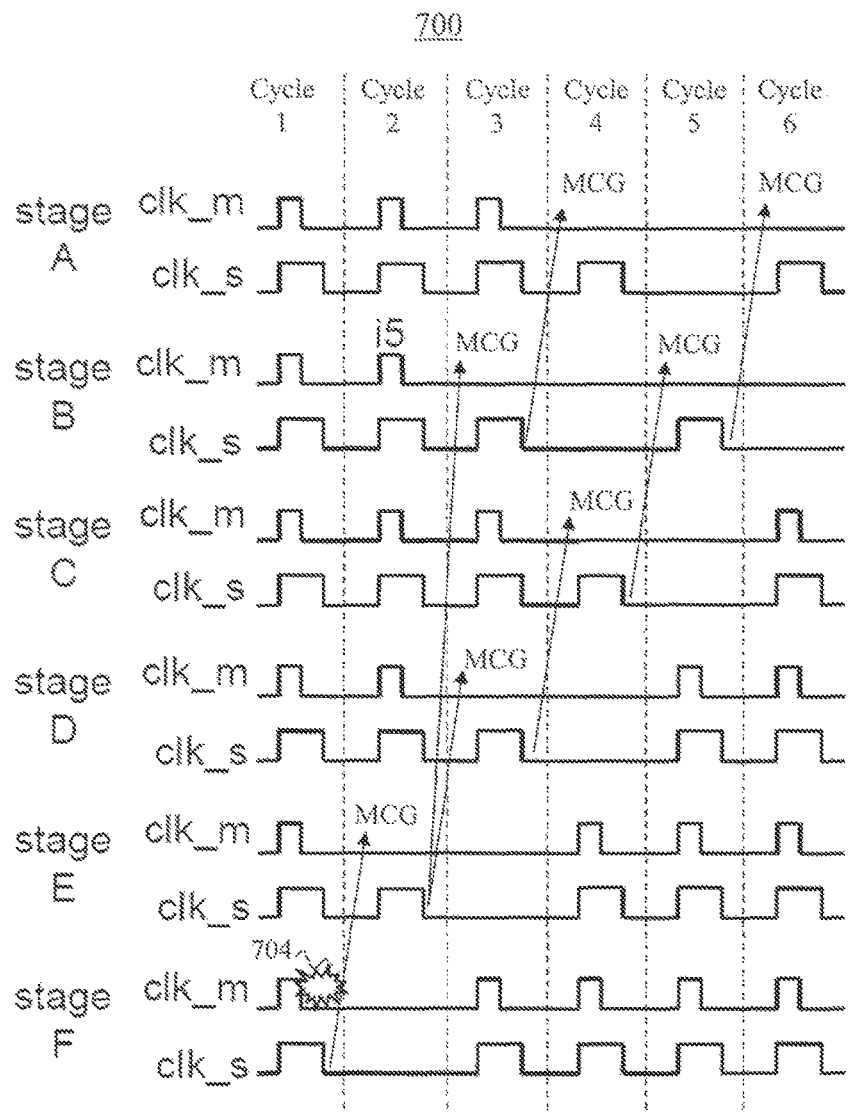
FIG. 8 shows a timing diagram having double sampling due to multiple fan-out stages, in accordance with one illustrative embodiment.
Figure 8:
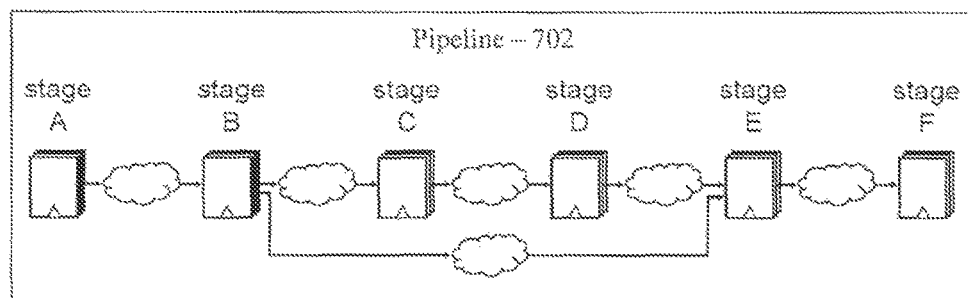

The second problem is double sampling at a multiple fan-out stage when not all of the output stages have sent an MCG signal. Referring now to FIG. 8, a timing diagram 700 showing double sampling at stage C is depicted in accordance with one illustrative embodiment. The timing diagram 700 includes stages A-F of a pipeline 702, each having clk_m and clk_s, over cycles 1-6. An error 704 occurs at stage F of cycle 1. In cycle 3, stage B receives an MCG signal from stage E, and then clk_m of stage B is gated to retain the previous data i5. Therefore, i5 is double sampled at stage C.

Figure 9:
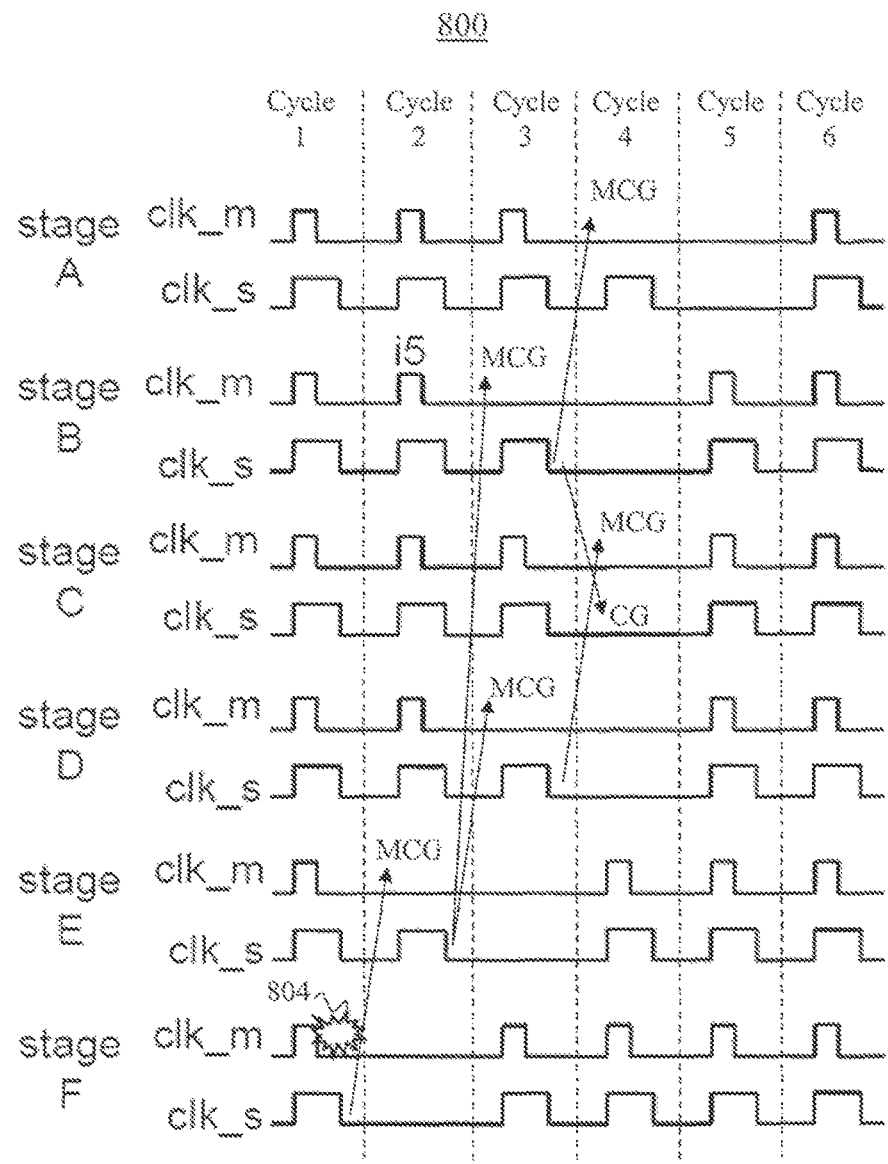
FIG. 9 shows a timing diagram addressing double sampling, in accordance with one illustrative embodiment.
Figure 9:
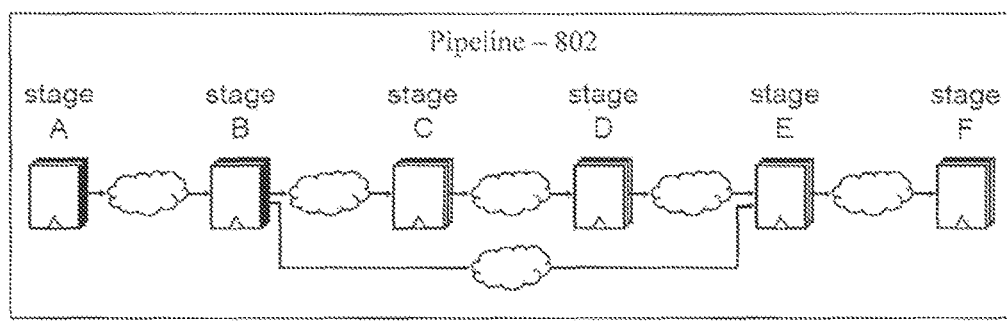

The problem of double sampling can be solved by applying the following: if a stage receives an MCG signal from any of its output stages, it sends CG signals to all of its output stages in the next cycle. Referring now to FIG. 9, a timing diagram 800 addressing double sampling is shown in accordance with one illustrative embodiment. The timing diagram 800 includes stages A-F of a pipeline 802, each having clk_m and clk_s, over cycles 1-6. An error 804 occurs at stage F of cycle 1. Stage B receives an MCG signal from its output stage D and thus sends a CG signal to its output stage C. An MCG signal is also sent from stage D to stage E (not shown) during cycle 4, however since stage E was gated during the previous cycle 3, the MCG signal will be immediately nullified. CG signals sent back to stages B, E and F are not shown in FIG. 9 for simplicity.

The error correction scheme of the present principles can also handle loop conditions. The main challenge is to prevent indefinite looping. Since CG and MCG signals are propagated in opposite directions and they always meet each other within a loop, propagation of CG and MCG stops and indefinite looping does not occur, regardless of whether the error occurs before the loop, in the loop, or after the loop.

Figure 10:
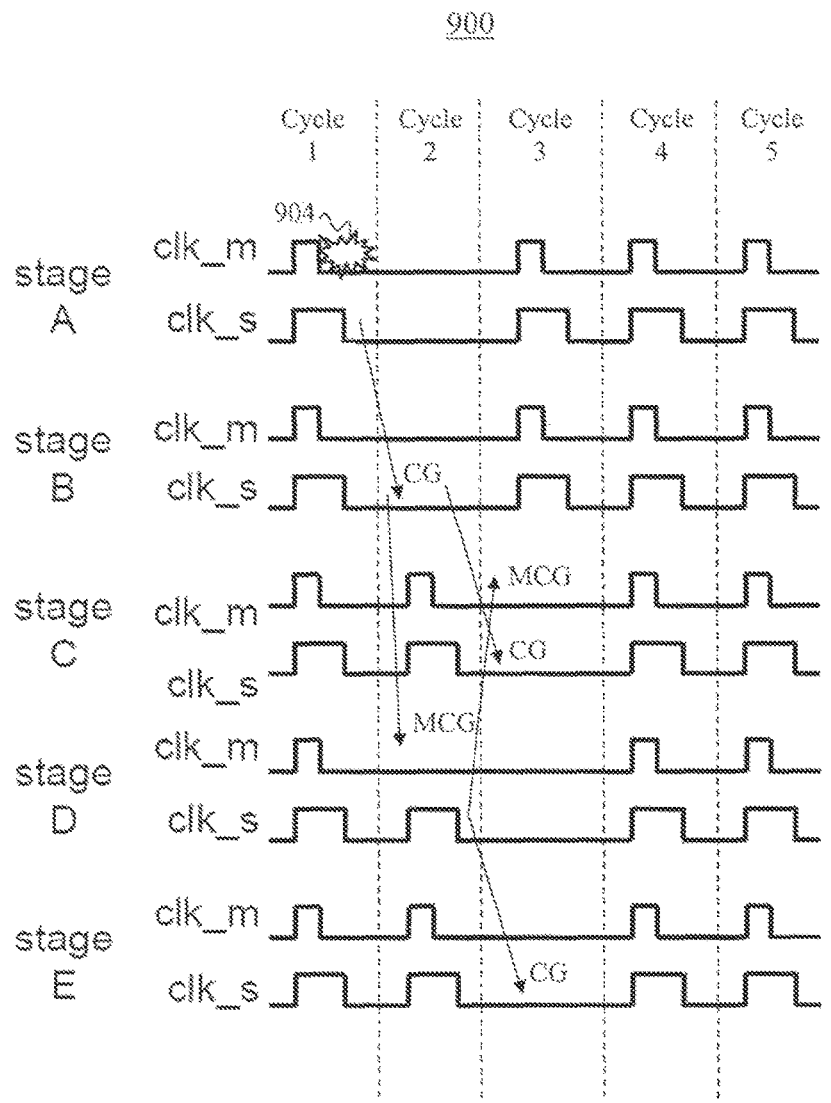
FIG. 10 shows a timing diagram for a pipeline having an error occurring before a loop, in accordance with one illustrative embodiment.
Figure 10:
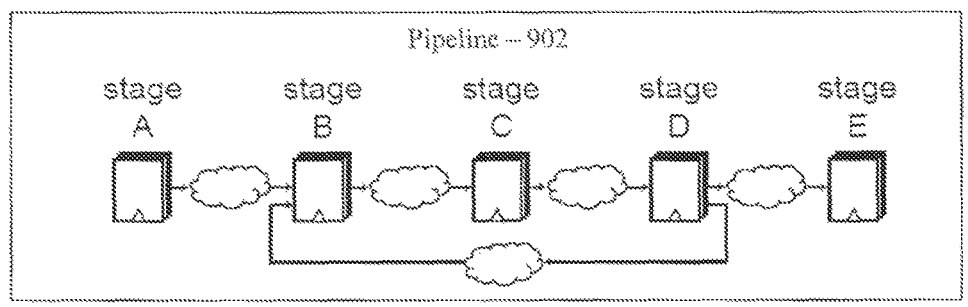

Referring now to FIG. 10, a timing diagram 900 for a pipeline having an error occurring before a loop is illustratively depicted in accordance with one illustrative embodiment. The timing diagram 900 includes stages A-E of a pipeline 902, each having clk_m and clk_s, over cycles 1-5. An error 904 occurs at stage A of cycle 1 and a CG signal is inserted into the loop. The CG signal and MCG signal meet each other at stage C of the cycle 3 and therefore, propagation of the CG and MCG signals are stopped at stage C. In addition, the CG signal is propagated to stage E, which is outside the loop, and then the signal is propagated to the upstream stages in a wave-like fashion.

Figure 11:
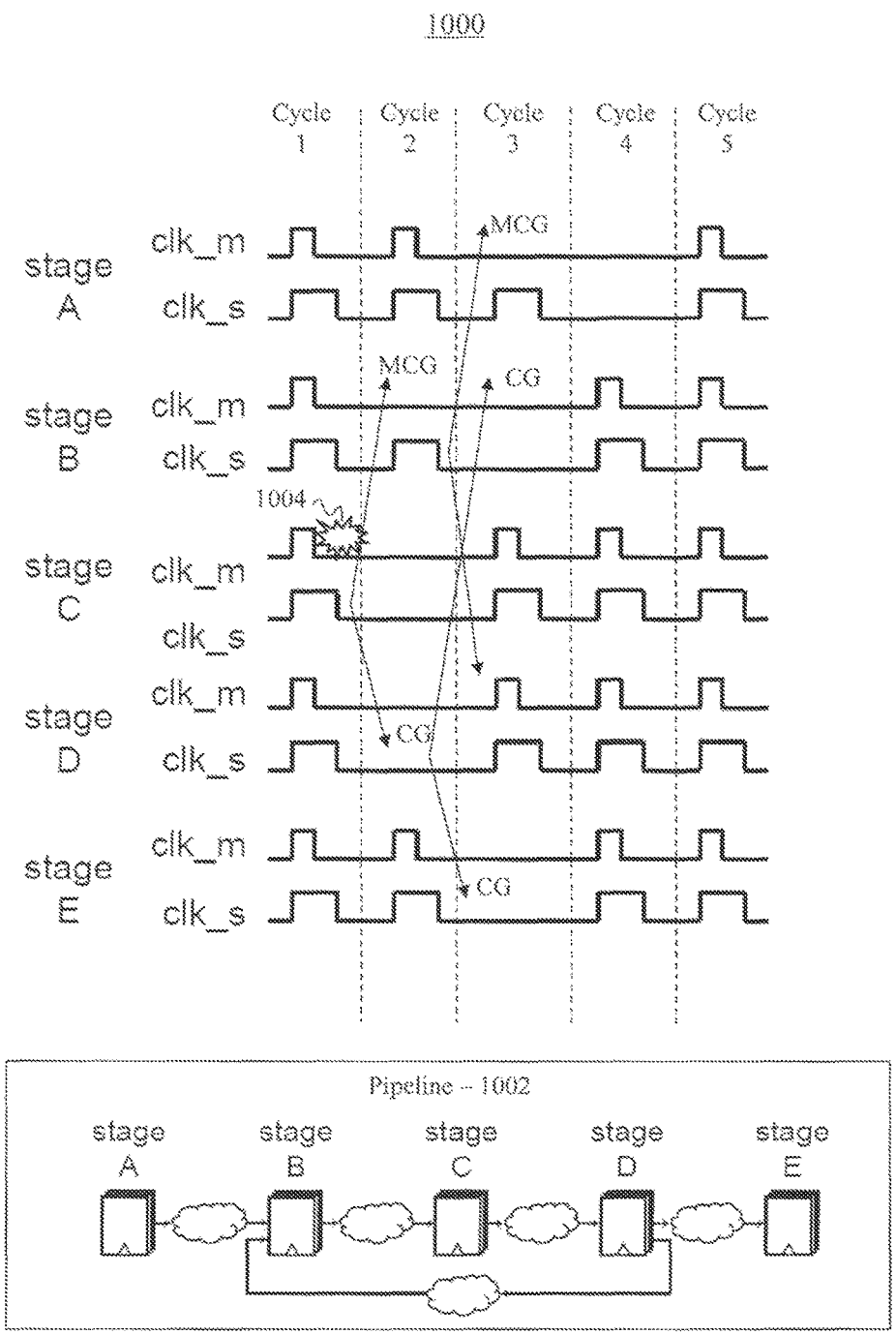
FIG. 11 shows a timing diagram for a pipeline having an error within a loop, in accordance with one illustrative embodiment.

Referring now to FIG. 11, the timing diagram 1000 for the pipeline 1002 shows an error within a loop, in accordance with one illustrative embodiment. The error 1004 occurs at stage C of cycle 1. The CG and MCG signals are propagated in opposite directions in the loop. Propagation of the signals is stopped at stages B and D, since stages B and D received a clock gating signal in the previous cycle.

Figure 12:
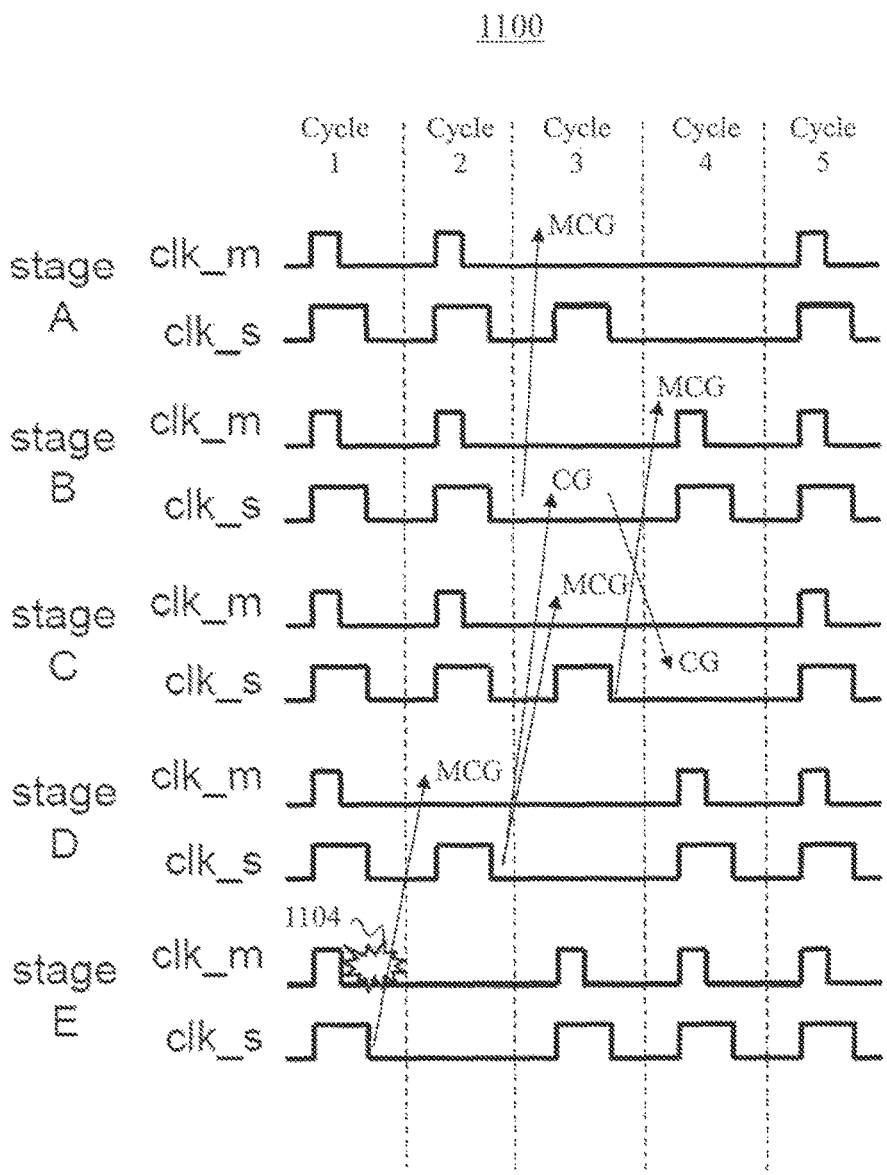
FIG. 12 shows a timing diagram for a pipeline having an error after a loop, in accordance with one illustrative embodiment.
Figure 12:
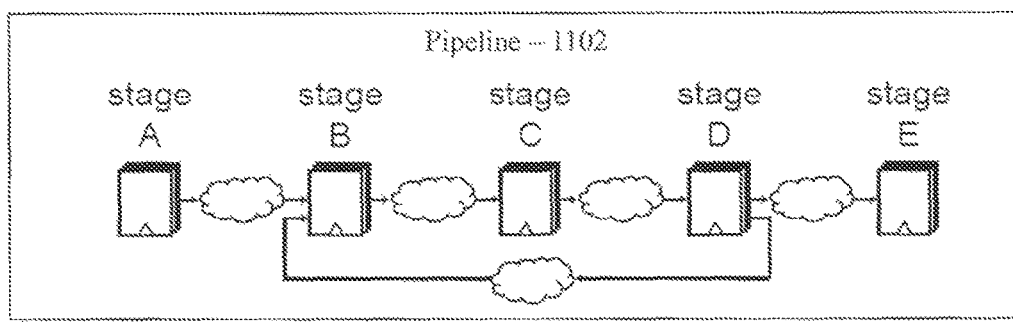

Referring now to FIG. 12, the timing diagram 1100 for the pipeline 1102 shows an error after the loop, in accordance with one illustrative embodiment. An error 1104 occurs at stage E of the first cycle. An MCG signal is propagated back to the loop. Stage D receives the signal and sends a CG signal to stage B and an MCG signal to stage C. Due to the stop conditions of the clock gating signals, propagation of the CG and MCG signals stop at stages B and C.

Figure 13:
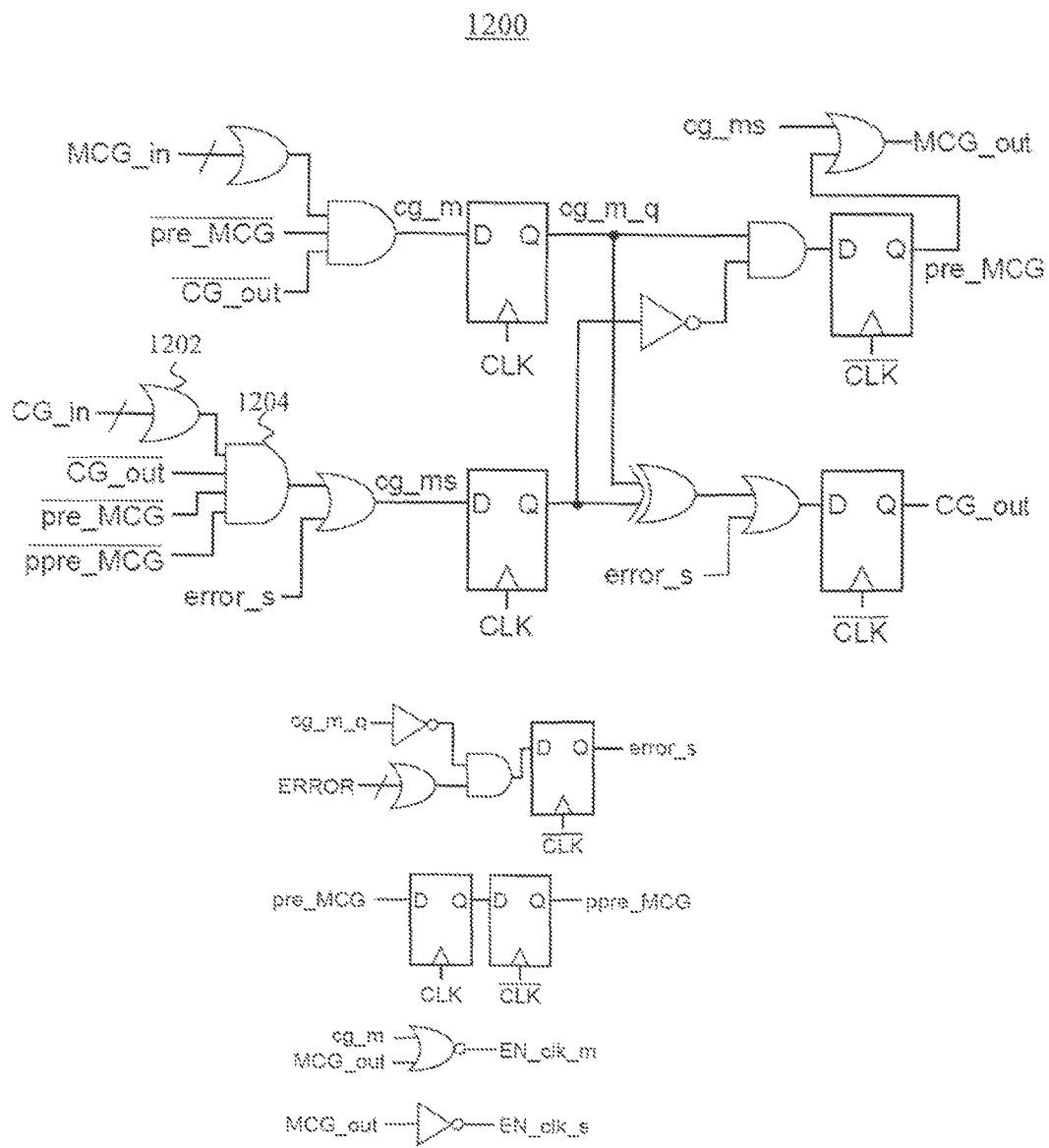
FIG. 13 shows control logic, in partial schematic form, for error recovery, in accordance with one illustrative embodiment.

Referring now to FIG. 13, control logic 1200 for error correction is depicted, in schematic form, in accordance with one illustrative embodiment. Sequential elements are illustratively shown in FIG. 13 as transparent latches. When a stage receives a CG signal from any of its input stages, node cg_ms becomes high, causing node MCG_out to be high. As a result, MCG signals are propagated back to its output stages in the same cycle. When a stage receives an MCG signal from any of its output stages, the outputs of XOR gate 1202 and AND gate 1204 become high. Therefore, both the MCG and CG signals are propagated to its neighbor stages in the next cycle. Nodes pre_MCG, $\overline{\text{CG\_out}}$ and ppre_MCG are for the stop conditions.

In the modified approach, a stage which received an MCG signal in the previous cycle should send a CG signal to its output stages in the same cycle. However, the propagation of CG signals should be stopped if the stage received an MCG signal in the previous cycle. The node ppre_MCG_b takes care of this case.

Referring now to FIG. 14, a block/flow diagram is shown for a method for error recovery 1300, in accordance with one illustrative embodiment. In block 1302, an error is determined in at least one stage of a plurality of stages during a first cycle, wherein each of the plurality of stages have a main latch and a shadow latch. Preferably, the plurality of stages is a pipeline. The error may be a timing error. In one embodiment, the shadow latch is configured to have a wider pulse clocking than the main latch. Determining an error may include comparing data in the main latch and the shadow latch, e.g., using an XOR gate.

In block 1304, a clock gating signal is transmitted in response to the error. In block 1306, a first signal (i.e., a CG signal) is transmitted to an output stage of the at least one stage to stall the main latch and the shadow latch during a second cycle. In block 1308, a second signal (i.e., an MCG signal) is transmitted to an input stage of the at least one stage to stall the main latch of the input stage during the second cycle and to stall the main latch and the shadow latch of the input stage during a third cycle. The first and second signals may be propagated to an output stage and input stage, respectively, in a wave-like fashion.

When there are multiple errors, the first and second signals may meet or cross each other. The present principles stop propagation of the signals to maintain proper operation. In block 1310, transmission of the first or second signal is stopped at a receiving stage where the receiving stage was stalled (at the main latch or the shadow latch) during a previous cycle. In block 1312, transmission of the first and second signals is stopped at a receiving stage where the receiving stage receives both the first and second signal at a same cycle.

Where there are multiple fan-out and multiple fan-in stages, data loss and double sampling should be accounted for. Data loss is addressed, in block 1314, by transmitting the second signal from a multiple fan-in stage to an input stage during a same cycle where the multiple fan-in stage receives the first signal. Double sampling is addressed, in block 1316, by transmitting the first signal from a multiple fan-out stage to an output stage in a next cycle where the multiple fan-out stage receives the second signal.

In block 1318, data is restored from the shadow latch to the main latch for the at least one stage and the input stage to recover from the error. Data is restored for each input stage during a next cycle from when the second signal is received.

Having described preferred embodiments of a system and method for a pulsed-latch based razor with 1-cycle error recovery scheme (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for error recovery, comprising:
an error detection module configured to determine an error in at least one stage of a plurality of stages during a first cycle on a data processing hardware circuit; and
a control module configured to transmit a first signal to an output stage of the at least one stage to stall a main latch and a shadow latch of the output stage during a second cycle,
the control module further configured to transmit a second signal to an input stage of the at least one stage, and
the control module further configured to restore data for the at least one stage and the input stage to recover from the error.

2. The system of claim 1, wherein each of the plurality of stages has a main latch and a shadow latch.

3. The system of claim 2, wherein the control module is further configured to stall the main latch of the input stage during the second cycle and to stall the main latch and the shadow latch of the input stage during a third cycle.

4. The system as recited in claim 3, wherein the control module is further configured to stop transmission of the first or second signals at a receiving stage where the receiving stage was stalled during a previous cycle.

5. The system as recited in claim 2, wherein a clock pulse of the shadow latch is wider than the clock pulse of the main latch.

6. The system as recited in claim 2, wherein error detection module is configured to compare the main latch with the shadow latch.

7. The system as recited in claim 1, wherein the control module is further configured to stop transmission of the first and second signals at a receiving stage where the receiving stage receives both the first and second signals during a same cycle.

8. The system as recited in claim 1, wherein the control module is further configured to transmit the second signal from a multiple fan-in stage to an input stage during a same cycle where the multiple fan-in stage receives the first signal.

9. The system as recited in claim 1, wherein the control module is further configured to transmit the first signal from a multiple fan-out stage to an output stage in a next cycle where the multiple fan-out stage receives the second signal.

10. The system as recited in claim 1, wherein the plurality of stages includes a plurality of stages of a pipeline.

11. The system as recited in claim 1, wherein the error includes a timing error.

12. The system as recited in claim 1, wherein the hardware circuit includes an integrated circuit.

13. A non-transitory computer readable storage medium comprising a computer readable program for error recovery, wherein the computer readable program when executed on a computer causes the computer to perform the following steps:
determining an error in at least one stage of a plurality of stages during a first cycle on a data processing hardware circuit;
transmitting a first signal to an output stage of the at least one stage;
transmitting a second signal to an input stage of the at least one stage; and
restoring data for the at least one stage and the input stage to recover from the error.

* * * * *